United States Patent
Manca et al.

(10) Patent No.: US 7,607,020 B2
(45) Date of Patent: Oct. 20, 2009

(54) COMMUNICATION WITH AN EXTERNAL SOURCE APPLICATION

(75) Inventors: Mark Manca, Ottawa (CA); Les G. Woolsey, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 688 days.

(21) Appl. No.: 11/069,248

(22) Filed: Mar. 1, 2005

(65) Prior Publication Data

US 2006/0200536 A1 Sep. 7, 2006

(51) Int. Cl.
*H04L 9/00* (2006.01)
*G06F 3/00* (2006.01)

(52) U.S. Cl. ............................ 713/176; 726/4; 715/741; 715/748

(58) Field of Classification Search ........................ None
See application file for complete search history.

(56) References Cited

U.S. PATENT DOCUMENTS

| | | | |
|---|---|---|---|
| 4,851,825 A | 7/1989 | Naiman | |
| 5,335,290 A | 8/1994 | Cullen et al. | |
| 5,341,429 A | 8/1994 | Stringer et al. | |
| 5,533,123 A | 7/1996 | Force et al. | |
| 5,745,879 A | 4/1998 | Wyman | |
| 6,209,092 B1 | 3/2001 | Linnartz | |
| 6,226,618 B1 | 5/2001 | Downs et al. | |
| 6,236,971 B1 | 5/2001 | Stefik et al. | |
| 6,240,185 B1 | 5/2001 | Van Wie et al. | |
| 6,289,455 B1 | 9/2001 | Kocher et al. | |
| 6,314,409 B2 | 11/2001 | Schneck et al. | |
| 6,389,402 B1 | 5/2002 | Ginter et al. | |
| 6,799,302 B1 | 9/2004 | Sites | |
| 7,065,756 B2 * | 6/2006 | Barsness et al. ............. | 717/148 |
| 7,149,721 B1 | 12/2006 | Sites et al. | |
| 7,155,415 B2 | 12/2006 | Russell et al. | |
| 7,278,168 B1 * | 10/2007 | Chaudhury et al. ........... | 726/30 |
| 2002/0011990 A1 * | 1/2002 | Anwar ........................ | 345/173 |
| 2002/0049679 A1 | 4/2002 | Russell et al. | |
| 2002/0073322 A1 * | 6/2002 | Park et al. ................... | 713/188 |
| 2003/0140068 A1 * | 7/2003 | Yeung ......................... | 707/204 |
| 2004/0040012 A1 * | 2/2004 | Barsness et al. ............. | 717/123 |
| 2004/0059678 A1 | 3/2004 | Stefik et al. | |
| 2004/0139092 A1 * | 7/2004 | Jones et al. ................. | 707/100 |

(Continued)

OTHER PUBLICATIONS

Adobe Reader 6.0, Online Help—Exporting and importing form data, Adobe Systems, Inc., p. 42, 2003.

(Continued)

*Primary Examiner*—Christian LaForgia
(74) *Attorney, Agent, or Firm*—Fish & Richardson P.C.

(57) ABSTRACT

Methods and apparatus, including computer program products, for communication with an external source application. In one aspect, the methods include determining in an independent reader application residing on a client computing system whether a property of an electronic package received and displayed from a source application residing on a server computing system is enabled, determining an authentication of the source application, and enabling a user interface-like communications channel between elements of the electronic package and the source application only if the property is enabled and the source application authenticated, wherein elements of the displayed electronic package are sent to and incorporated by the source application upon authentication of the property of the electronic package and the property of the source application.

15 Claims, 1 Drawing Sheet

U.S. PATENT DOCUMENTS

| | | | | |
|---|---|---|---|---|
| 2004/0194014 | A1* | 9/2004 | Anwar | 715/500 |
| 2004/0205533 | A1* | 10/2004 | Lopata et al. | 715/507 |
| 2005/0004885 | A1* | 1/2005 | Pandian et al. | 707/1 |
| 2005/0204130 | A1* | 9/2005 | Harris | 713/165 |
| 2006/0155618 | A1* | 7/2006 | Wyle | 705/31 |

OTHER PUBLICATIONS

Adobe Reader 6.0, Online Help—About usage rights, Adobe Systems, Inc., p. 106, 2003.

Adobe Reader 6.0, Online Help—Help, Adobe Systems, Inc., 179 pages, 2003.

3.1. 2 Sketchpad in Vision and Reality of Hypertext and Graphical User Interfaces, downloaded from the internet at Http://www.mprove.de/diplom/text/3.1.2_ sketclapad.html on May 22, 2009, 3 pages.

About FileOpen Publisher (Feb. 9, 2001) www.fileopen.com/fopubpage.html, 1 page.

Amano, "A Feature Calibration Method for Watermarking of Document Images", Sep. 1999 IBM Research pp. 1-4.

FileOpen Personal Publisher 1.0 User Manual (v10) Jun. 1, 2000, 18 pages.

Microsoft Press Computer Dictionary, Microsoft Press, Third Edition, p. 358.

Pensinger, "DVD Gets Copy-Protection Boost", May 1998, Technology, p. 78.

Russell, et al. U.S. Appl. No. 60/195,870.

Schneier, Bruce "Applied Cryptography", 1996, John Wiley & Sons, Second Edition, p. 31-34.

Seybold New York: Hot Trends and Product announcements (May 1998) www.dtojourtal.com/araives/9805d1 .html 2 pages.

Sherr, Office action in U.S. Appl. No. 11/472,496 filed Jun. 20, 2006 "Electronic Content Rights with And-Or Expression" by Sites, et al., 17 Pages.

VLSI Technology: Encryption-Based Copy Protection of Divx Platform Satisfies Studios & Content Providers, Jan. 1998, M2 Presswire, pp. 1-2.

* cited by examiner

COMMUNICATION WITH AN EXTERNAL SOURCE APPLICATION

BACKGROUND OF THE INVENTION

The present invention relates to communication with an external source application.

Adobe® portable document format (PDF) is a file format that captures all the elements of a printed document as an electronic image that one can view, navigate, print, or forward. PDF files are generated using Adobe® Reader®, Acrobat® Capture, or similar products from Adobe Corporation. Adobe® Reader® is an application that is used to view PDF files. The Adobe® Reader® is free and can be used as a plug-in with a Web browser, such as Mozilla Firefox, or started by itself.

With the growing usage of portable document format readers such as the free Adobe® Reader®, application developers seek to-selectively allow communication between a document viewed using a reader application and a source application.

SUMMARY OF THE INVENTION

The present invention provides methods and apparatus, including computer program products, for communication with an external source application.

In general, in one aspect, the invention features a computer-implemented method including receiving an electronic package from a source application residing on a network server for display by a reader application independent of the source application, and enabling a communications channel between elements of the electronic package displayed by the reader application and the source application based on a property of the electronic package and a property of the source application, wherein elements of the displayed electronic package can be sent to and incorporated by the source application upon authentication of the property of the electronic package and the property of the source application.

The invention can be implemented to include one or more of the following advantageous features. The property of the electronic package can be a usage right. The usage right can be protected by a digital signature.

In embodiments, the property of the source application can be an authentication indication between the reader application displaying the electronic package and the server. The authentication indication can include an exchange and verification of derived values between the reader application displaying the electronic package and the source application. The reader application can include an electronic document reader application. The electronic document reader application can be a Portable Document Format (PDF) document reader application. The electronic document reader application can be an Extensible Markup Language (XML) reader application. The reader application can reside on a client.

In general, in another aspect, the invention features a computer-implemented method including determining in an independent reader application residing on a client computer whether a property of an electronic package received and displayed from a source application residing on a server is enabled, determining an authentication of the source application, and enabling a user interface-like communications channel between elements of the electronic package and the source application only if the property is enabled and the source application authenticated, wherein elements of the displayed electronic package are sent to and incorporated by the source application upon authentication of the property of the electronic package and the property of the source application.

The invention can be implemented to include one or more of the following advantageous features. The property of the electronic package can be a usage right. Determining the authentication of the source application can include issuing a challenge from the reader application to the source application as a number, in the server, generating a source application derived value from the number, in the client computer, generating a client derived value from the number, and determining whether the source application derived value matches the client derived value.

The property of an electronic package can be protected by a digital signature. The number can be protected by a digital signature.

The invention can be implemented to realize one or more of the following advantages. The method enables user interface (UI) like interaction via a communication channel between elements of an electronic package displayed by a reader application, such as a Portable Document Format (PDF) document or an XML document, and a source application based on a property of the electronic package and an authentication of the source of electronic package, e.g., server.

External communication in a user interface manner between a reader application and an external source application is enabled only if usage rights are set in an electronic package and an authentication of a source of the electronic package.

The method enables communication between a reader application and an external application. When the electronic package is loaded by the reader application, the method checks that the electronic package has a special usage right, which is embedded in the package and protected by a digital signature. This enables a user of a reader application to save changes that the user makes to the displayed package. If the usage right is present in the electronic package, the method checks which server the electronic package originates from. The method issues a challenge from the reader application to the server in the form of a number. The server manipulates the number and returns a derived number. A reader application client performs the same bit manipulations. If the manipulations match, the server where the package originated is authenticated and external communication is enabled between the reader application to an external application residing on the server.

One implementation of the invention provides all of the above advantages.

Other features and advantages of the invention are apparent from the following description, and from the claims.

BRIEF DESCRIPTION OF THE DRAWINGS

FIG. 2 is a flow diagram.
Like reference numbers and designations in the various drawings indicate like

DETAILED DESCRIPTION

Figure 1:
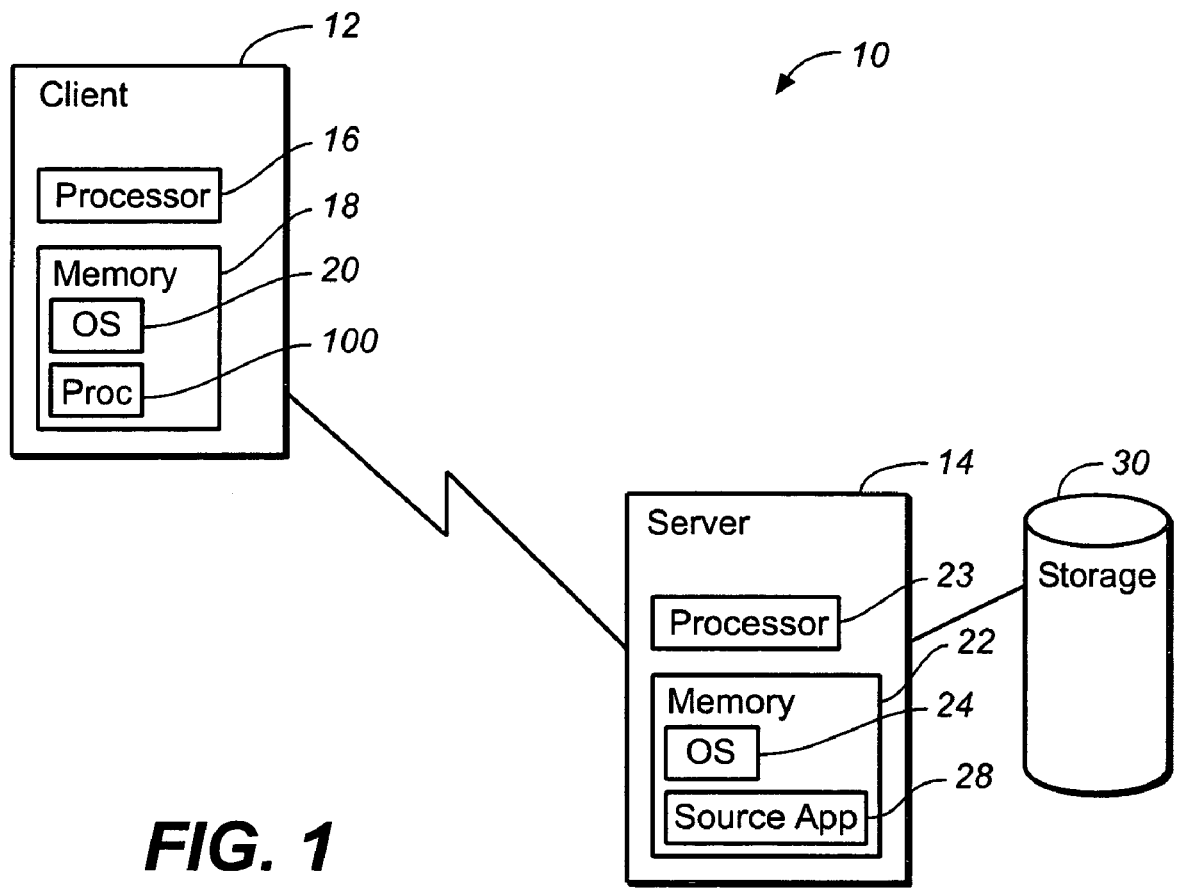
FIG. 1 is a block diagram.

As shown in FIG. 1, an exemplary network 10 includes a client computer system 12 linked to an application server 14. The client computer system 12 can include a processor 16 and memory 18. Memory 18 includes an operating system 20, such as Windows or Linux, and a reader application process 100. The application server 14 can include a memory 22 and processor 23. Memory 22 includes an operating system 24 and an source application program 28. The source application program 28 generates electronic packages, such as documents, which are read by the reader application process 100. The reader application process 100 is independent of the source application program 28. The application server 14 can also include a storage device 30.

In one particular example, the reader application process 100 is incorporated into a Portable Document Format (PDF) reader application, such as Adobe® Reader®. The PDF reader application can be used as a plug-in with a Web browser, such as Mozilla Firefox, or started by itself. In other examples, the reader application process 100 is incorporated into an Extensible Markup Language (XML) reader application.

Figure 2:
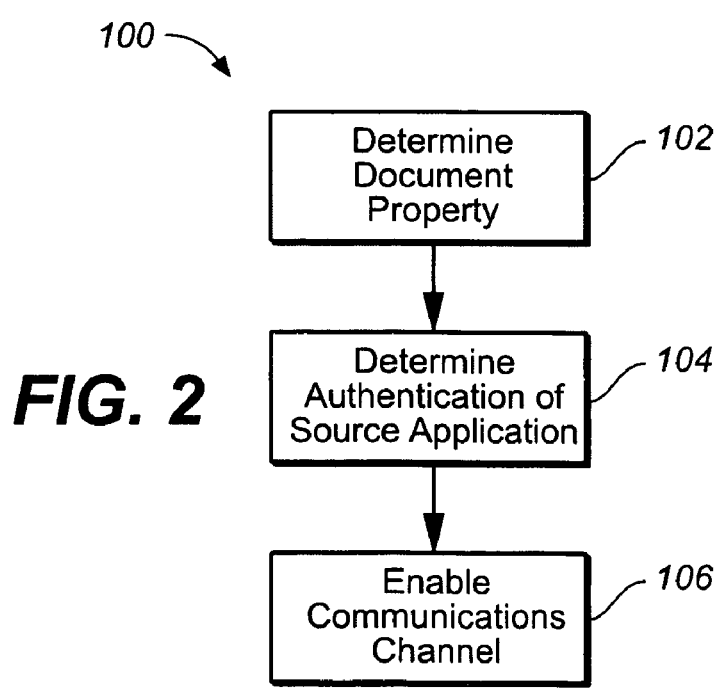

As shown in FIG. 2, the reader application process 100 includes determining (102) whether a property of an electronic package, such as an electronic document, received from a source application residing on a server, is enabled. In a particular example, the property of the electronic package is a usage right and process 100 determines whether this usage right is enabled in the received electronic package. In one particular example, this property of the electronic package is protected by a digital signature. A digital signature is an electronic signature that can be used to authenticate the identity of the sender of a message or the signer of an electronic package, and to ensure that the original content of the message or electronic package that has been sent is unchanged. Digital signatures are easily transportable, cannot be imitated by someone else, and can be automatically time-stamped.

Process 100 determines (104) an authentication of the source application originating the electronic package. Only authenticated sources can undergo further processing. In one particular example, determining (104) an authentication of the source application includes issuing a challenge to the source application. For example, the challenge can include a number. In response, the source application derives a value from the received number. The same number is used in a client reader application to generate a client reader application derived value. Process 100 determines whether the source application derived value matches the client reader application derived value. In some implementations, the number is protected by a digital signature.

Process 100 provides (106) a communications channel between the reader application displaying elements of the electronic package and the source application in a user interface (UI)-like manner only if the property is enabled and the source application authenticated. Here, the communications channel allows fields displayed by the reader application and associated with the electronic package to be modified by a user. The modified fields are then sent via the communications channel from the reader application to the source application and utilized by the source application. Without an enabled usage right and an authenticated source application the reader application merely displays the electronic package; no selective fields can be modified. When the usage right is enabled and the source application authenticated the communication channel is enabled, providing an interface between the displayed electronic package and the source application. Here, the user can modify selected displayed fields of the electronic package and the source application accepts the information for incorporation into the source application. In effect, the reader application enables a point of communication and interaction between the user and the source application.

In one particular example, the reader application is a Portable Document Format (PDF) document reader, such as Adobe® Reader®, displaying fields of the electronic package in a PDF document. In other particular applications, the reader application is an Extensible Markup Language (XML) reader application, such as SAX, DOM, JDOM, or JAXP, displaying fields of an XML document. These readers are application program interfaces (APIs) used for XML processing.

Example electronic packages include document forms such as tax information forms, employee information forms, and so forth.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

The invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It is to be understood that the foregoing description is intended to illustrate and not to limit the scope of the invention, which is defined by the scope of the appended claims. Other embodiments are within the scope of the following claims.

What is claimed is:

1. A computer-implemented method comprising:
   receiving an electronic form from a source application residing on an application server;
   determining that a usage right property embedded in the electronic form is enabled, wherein the determining is performed by an electronic document reader application residing on a client computer, and wherein the electronic document reader application is distinct from the source application;
   determining that the source application is authenticated, wherein authenticating the source application comprises:
      issuing a challenge from the electronic document reader application to the source application;
      receiving a first value at the electronic document reader application from the source application, wherein the first value is derived from the challenge by the source application;
      deriving a second value, wherein the second value is derived from the challenge by the electronic document reader application; and
      determining that the source application is authenticated if the first value matches the second value, wherein the determining is performed by the electronic document reader application;
   displaying the electronic form in the electronic document reader application, wherein displayed fields of the electronic form can be modified in the electronic document reader application; and
   enabling a communications channel between the electronic document reader application and the source application, whereby the displayed fields of the electronic form are sent to the source application through the communications channel, wherein the enabling is performed by the electronic document reader application.

2. The computer-implemented method of claim 1, wherein the usage right property is protected by a digital signature.

3. The computer-implemented method of claim 1, wherein the challenge is protected by a digital signature.

4. The computer-implemented method of claim 1, wherein the electronic document reader application is a Portable Document Format (PDF) document reader application.

5. The computer-implemented method of claim 1, wherein the electronic document reader application is incorporated into an Extensible Markup Language (XML) document reader application.

6. A computer program product, tangibly stored on a machine readable storage device, comprising instructions operable to cause a programmable processor to:
   receive an electronic form from a source application residing on an application server;
   determine that a usage right property embedded in the electronic form is enabled, wherein the determining is performed by an electronic document reader application residing on a client computer, and wherein the electronic document reader application is distinct from the source application;
   determine that the source application is authenticated, wherein authenticating the source application comprises:
      issuing a challenge from the electronic document reader application to the source application;
      receiving a first value at the electronic document reader application from the source application, wherein the first value is derived from the challenge by the source application;
      deriving a second value, wherein the second value is derived from the challenge by the electronic document reader application; and
      determining that the source application is authenticated if the first value matches the second value, wherein the determining is performed by the electronic document reader application;
   display the electronic form in the electronic document reader application, wherein displayed fields of the electronic form can be modified in the electronic document reader application; and
   enable a communications channel between the electronic document reader application and the source application, whereby the displayed fields of the electronic form are sent to the source application through the communications channel, wherein the enabling is performed by the electronic document reader application.

7. The computer program product of claim 6, wherein the usage right property is protected by a digital signature.

8. The computer program product of claim 6, wherein the challenge is protected by a digital signature.

9. The computer program product of claim 6, wherein the electronic document reader application is a Portable Document Format (PDF) document reader application.

10. The computer program product of claim 6, wherein the electronic document reader application is incorporated into an Extensible Markup Language (XML) document reader application.

11. computing system, comprising:
   an application server; and
   a client computer, wherein the client computer is interconnected to the application server, comprising a display device, one or more processors, and a machine-readable storage device, wherein the machine-readable storage device comprises instructions operable to cause the one or more processors of the client computer to perform the following operations:
      receive an electronic form from a source application residing on the application server;
      determine that a usage right property embedded in the electronic form is enabled, wherein the determining is performed by an electronic document reader application residing on the client computer, and wherein the electronic document reader application is distinct from the source application;
      determine that the source application is authenticated, wherein authenticating the source application comprises:
         issuing a challenge from the electronic document reader application to the source application;
         receiving a first value at the electronic document reader application from the source application, wherein the first value is derived from the challenge by the source application;

deriving a second value, wherein the second value is derived from the challenge by the electronic document reader application; and determining that the source application is authenticated if the first value matches the second value, wherein the determining is performed by the electronic document reader application;

display the electronic form in the electronic document reader application, wherein displayed fields of the electronic form can be modified in the electronic document reader application; and enable a communications channel between the electronic document reader application and the source application, whereby the displayed fields of the electronic form are sent to the source application through the communications channel, wherein the enabling is performed by the electronic document reader application.

12. The computing system of claim 11, wherein the usage right property is protected by a digital signature.

13. The computing system of claim 11, wherein the challenge is protected by a digital signature.

14. The computing system of claim 11, wherein the electronic document reader application is a Portable Document Format (PDF) document reader application.

15. The computing system of claim 11, wherein the electronic document reader application is incorporated into an Extensible Markup Language (XML) document reader application.

* * * * *

UNITED STATES PATENT AND TRADEMARK OFFICE
CERTIFICATE OF CORRECTION

| | | |
|---|---|---|
| PATENT NO. | : 7,607,020 B2 | Page 1 of 1 |
| APPLICATION NO. | : 11/069248 | |
| DATED | : October 20, 2009 | |
| INVENTOR(S) | : Mark Manca | |

It is certified that error appears in the above-identified patent and that said Letters Patent is hereby corrected as shown below:

On the Title page,

Item [*] Notice: Subject to any disclaimer, the term of this patent is extended or adjusted under 35 USC 154(b) by (688) days Delete the phrase "by 688 days" and insert -- by 1118 days --

Signed and Sealed this

Sixth Day of April, 2010

David J. Kappos
*Director of the United States Patent and Trademark Office*